US009003489B2

(12) United States Patent  
Ballal et al.

(10) Patent No.: US 9,003,489 B2  
(45) Date of Patent: Apr. 7, 2015

(54) SYSTEM AND METHOD FOR PROVIDING VIRTUAL USER GROUPS IN A NETWORK ENVIRONMENT

(75) Inventors: Dhiraj D. Ballal, Santa Clara, CA (US); Venkatesh Gota B R, San Jose, CA (US); Saravanadas P. Subramanian, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 12/700,208

(22) Filed: Feb. 4, 2010

(65) Prior Publication Data

US 2011/0191826 A1    Aug. 4, 2011

(51) Int. Cl.
*H04L 9/32* (2006.01)
*H04L 29/06* (2006.01)
*H04W 12/06* (2009.01)

(52) U.S. Cl.
CPC .............. *H04L 63/104* (2013.01); *H04W 12/06* (2013.01)

(58) Field of Classification Search
USPC ............................................................ 726/4
See application file for complete search history.

(56) References Cited

U.S. PATENT DOCUMENTS

| | | | |
|---|---|---|---|
| 5,666,655 A | 9/1997 | Ishikawa et al. | |
| 6,014,406 A | 1/2000 | Shida et al. | |
| 6,920,328 B2 | 7/2005 | Wollrab | |
| 7,203,752 B2 * | 4/2007 | Rice et al. | 709/225 |
| 7,263,076 B1 | 8/2007 | Leibovitz et al. | |
| 7,539,723 B2 | 5/2009 | Agrawal et al. | |
| 2002/0068546 A1 * | 6/2002 | Plush et al. | 455/406 |
| 2004/0157600 A1 | 8/2004 | Stumpert et al. | |
| 2005/0002504 A1 * | 1/2005 | Chevalier et al. | 379/114.01 |
| 2005/0195743 A1 * | 9/2005 | Rochberger et al. | 370/235 |

(Continued)

FOREIGN PATENT DOCUMENTS

| | | |
|---|---|---|
| WO | WO 99/01998 | 1/1999 |
| WO | WO 9901998 A1 * | 1/1999 |

OTHER PUBLICATIONS

Notification of Transmittal of the International Search Report and the Written Opinion (1 page), International Search Report (3 page), and Written Opinion of the International Search Authority (6 pages) for International Application No. PCT/US2010/054841 mailed Feb. 10, 2011.

(Continued)

*Primary Examiner* — Jung Kim  
*Assistant Examiner* — Tri Tran  
(74) *Attorney, Agent, or Firm* — Patent Capital Group

(57) ABSTRACT

A method is provided in one example and includes communicating an access request to a network element, the access request is associated with network authentication relating to a subscriber. The method also includes receiving an access response that includes a profile associated with the subscriber. The profile can include a group attribute that defines the subscriber as being part of a group of subscribers sharing a network data plan, which defines a data allotment assigned to the group over a specified time interval. In more detailed embodiments, a unique data string sent by an Authentication, Authorization, and Accounting element is received, where the unique data string identifies a full set of subscribers belonging to the group. Data underutilization of a first subscriber is offset by data overutilization of a second subscriber, where a summation of the data underutilization and the data overutilization do not exceed the data allotment assigned.

17 Claims, 5 Drawing Sheets

(56) References Cited

U.S. PATENT DOCUMENTS

2005/0281399 A1* 12/2005 Moisey et al. ................ 379/126
2006/0047793 A1   3/2006 Agrawal et al.
2006/0187897 A1   8/2006 Dabbs et al.
2008/0127320 A1*  5/2008 De Lutiis et al. ................ 726/9

OTHER PUBLICATIONS

PCT Aug. 16, 2012 International Preliminary Report on Patentability and Written Opinion from International Application No. PCT/US2010/054841; 7 pages.

* cited by examiner

```
EGSNPDPRecord       ::= SET                                                              80
{
    recordType                      [0] RecordType,
    networkInitiation               [1] NetworkInitiatedPDPContext OPTIONAL,
    servedIMSI                      [3] IMSI,
    ggsnAddress                     [4] GSNAddress,
    chargingID                      [5] ChargingID,
    sgsnAddress                     [6] SEQUENCE OF GSNAddress,
    accessPointNameNI               [7] AccessPointNameNI OPTIONAL,
    pdpType                         [8] PDPType OPTIONAL,
    servedPDPAddress                [9] PDPAddress OPTIONAL,
    dynamicAddressFlag              [11] DynamicAddressFlag OPTIONAL,
    listOfTrafficVolumes            [12] SEQUENCE OF ChangeOfCharCondition OPTIONAL,
    recordOpeningTime               [13] TimeStamp,
    duration                        [14] CallDuration,
    causeForRecClosing              [15] CauseForRecClosing,
    diagnostics                     [16] Diagnostics OPTIONAL,
    recordSequenceNumber            [17] INTEGER OPTIONAL,
    nodeID                          [18] NodeID OPTIONAL,
    recordExtensions                [19] ManagementExtensions OPTIONAL,
    localSequenceNumber             [20] LocalSequenceNumber OPTIONAL,
    apnSelectionMode                [21] APNSelectionMode OPTIONAL,
    servedMSISDN                    [22] MSISDN OPTIONAL,
    chargingCharacteristics         [23] ChargingCharacteristics,
    chChSelectionMode               [24] ChChSelectionMode OPTIONAL,
    iMSsignalingContext             [25] NULL OPTIONAL,
    externalChargingID              [26] OCTET STRING OPTIONAL,
    sgsnPLMNIdentifier              [27] PLMN-Id OPTIONAL,
    pSFurnishChargingInformation    [28] PSFurnishChargingInformation OPTIONAL,
    servedIMEISV                    [29] IMEI OPTIONAL,
    rATType                         [30] RATType OPTIONAL,
    mSTimeZone                      [31] MSTimeZone OPTIONAL,
    userLocationInformation         [32] OCTET STRING OPTIONAL,
    cAMELChargingInformation        [33] OCTET STRING OPTIONAL, listOfServiceData               [34] SEQUENCE OF ChangeOfServiceCondition OPTIONAL
}

ChangeOfServiceCondition    ::= SEQUENCE
{
    --
    -- Used for Flow based Charging service data container
    --
    ratingGroup                     [1] RatingGroupId,
    chargingRuleBaseName            [2] ChargingRuleBaseName OPTIONAL,
    datavolumeFBCUplink             [12] DataVolumeGPRS OPTIONAL,
    datavolumeFBCDownlink           [13] DataVolumeGPRS OPTIONAL,
      etc..
}
```

FIG. 3

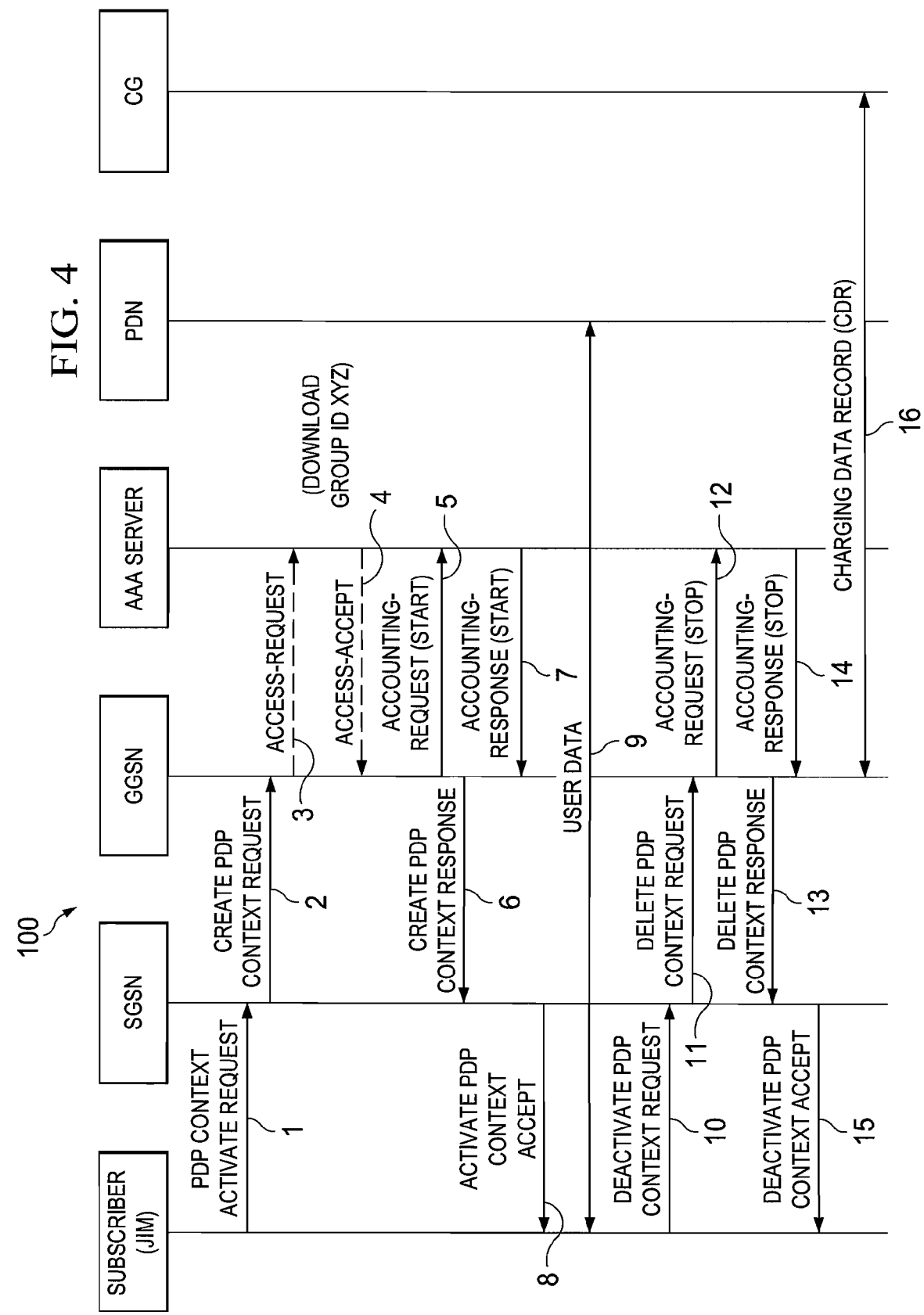

SYSTEM AND METHOD FOR PROVIDING VIRTUAL USER GROUPS IN A NETWORK ENVIRONMENT

TECHNICAL FIELD

This disclosure relates in general to the field of communications and, more particularly, to providing virtual user groups in a network environment.

BACKGROUND

Networking architectures have grown increasingly complex in communication environments. As the subscriber base of end users increases and/or becomes mobile, proper routing and efficient management of communication sessions and data flows becomes critical. Typically, subscribers seek to access content from various locations in the network. Subscribers may be provided connectivity or services based on some type of policy or agreement that involves a service provider. The service provider relationship commonly dictates the terms under which subscribers operate in the network. In some instances, subscribers could be grouped in some intelligent manner. The ability to manage subscribers and to bill them appropriately presents a significant challenge for component manufacturers, network operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified charging record in accordance with one example embodiment of the present disclosure; and FIGS. 4-5 are simplified flow diagrams illustrating potential operations associated with the communication system.

DETAILED DESCRIPTION OF EXAMPLE EMBODIMENTS

Overview

A method is provided in one example and includes communicating an access request to a network element, where the access request is associated with network authentication relating to a subscriber. The method also includes receiving an access response that includes a profile associated with the subscriber. The profile can include a group attribute that defines the subscriber as being part of a group of subscribers sharing a network data plan, which defines a data allotment assigned to the group over a specified time interval. In more detailed embodiments, a unique data string sent by an Authentication, Authorization, and Accounting (AAA) element is received, where the unique data string identifies a full set of subscribers belonging to the group. In still other embodiments, data underutilization of a first subscriber of the group is offset by data overutilization of a second subscriber of the group, where a summation of the data underutilization and the data overutilization do not exceed the data allotment assigned to the group. The group attribute can identify the subscriber as belonging to the group of subscribers by using an International Mobile Subscriber Identity (IMSI), a Mobile Subscriber Integrated Services Digital Network Number (MSISDN), a user name, or an Internet protocol (IP) address of the subscriber.

Example Embodiments

Figure 1:
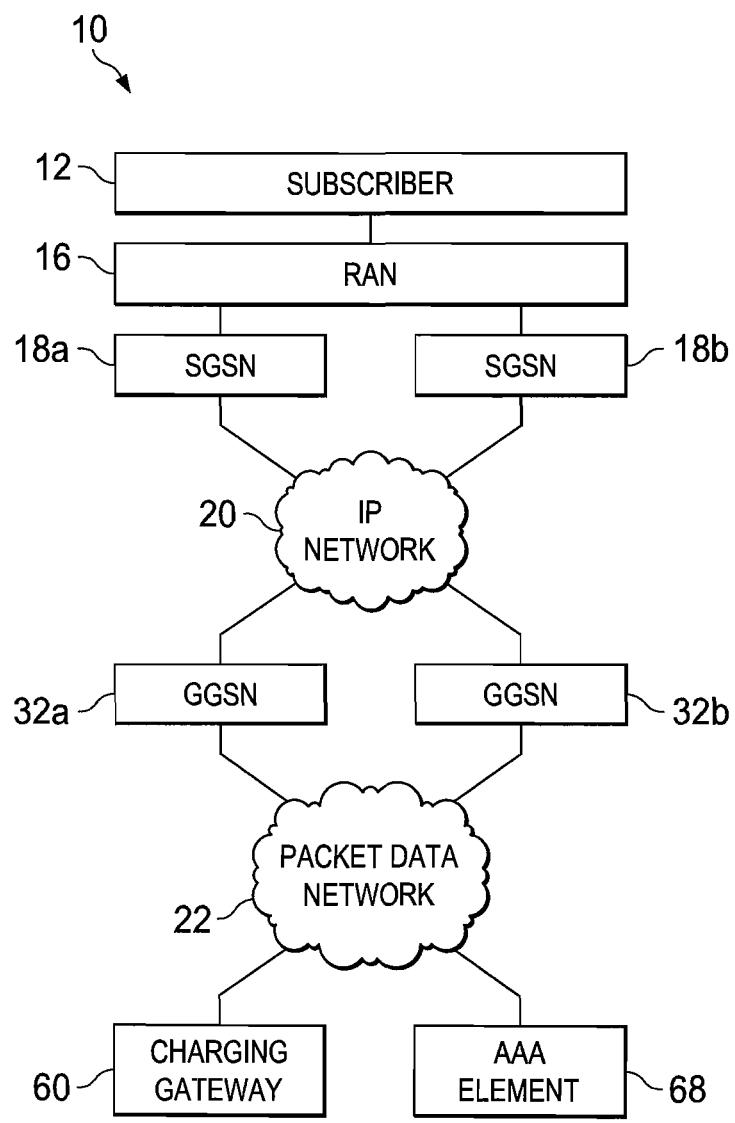
FIG. 1 is a simplified block diagram of a communication system for providing virtual talk groups in a network environment in accordance with one embodiment of the present disclosure.

Turning to FIG. 1, FIG. 1 is a simplified block diagram of a communication system 10 for providing a virtual talk group mechanism in a network environment. FIG. 1 may include a subscriber 12, a radio access network (RAN) 16, multiple serving general packet radio service (GPRS) support nodes (SGSNs) 18a and 18b, and an Internet protocol (IP) network 20. Additionally, communication system 10 may include multiple gateway GPRS support nodes (GGSNs) 32a and 32b. In addition, communication system 10 may include a charging gateway 60, a packet data network 22, and an Authentication, Authorization, and Accounting (AAA) element 68.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, a 3G, or a 4 G communication architecture applicable to a Global System for Mobile (GSM) environment in accordance with a particular embodiment of the present disclosure. Communication system 10 may also be configured to operate with any version of any suitable GPRS tunneling protocol.

For purposes of illustrating certain example techniques of communication system 10, it is important to understand the communications that may be traversing the network. The following foundational information may be viewed as a basis from which the present disclosure may be properly explained. Typically, a given subscriber is allocated a certain service plan based on his individual data usage. When that usage has been exceeded, the subscriber is either prohibited from initiating additional flows, or he may experience some type of financial penalty for the overage. The overage may be based on bytes in the call detail records (CDRs), or be based on the specific type of data that propagates in the network.

Communication system 10 can address and enhance data management issues by forming one or more virtual user groups, which could include family members, groups of people with common interests, coworkers and business colleagues, etc. A given network element (e.g., the GGSN, a packet gateway (PGW)) can be configured to identify bearers belonging to the group. The bearers may reside on one GGSN, or they can be provisioned across different GGSNs. Charging records can then be generated for the group, where any type of billing arrangement could be accommodated by communication system 10. These possible arrangements (e.g., rollover accounts, discounted rates for intra-group communications, etc.) are discussed in greater detail below. The billing mechanism can further include usage reports for both byte counts within, and outside of, the virtual talk group's designated settings.

In operation of an example flow that is illustrative of certain aspects of communication system 10, when a given user of the virtual talk group connects to a particular network element (e.g., a GGSN, a packet gateway (PGW), etc.), a unique data string can be downloaded from AAA element 68. AAA element 68 has the intelligence to readily identify this user as belonging to a particular group (e.g., using an identifier such as the primary subscriber's International Mobile Subscriber Identity (IMSI), Mobile Subscriber Integrated Services Digital Network Number (MSISDN), an IP address, etc.).

In a similar fashion, as other members of the virtual talk group connect to the particular node, AAA element 68 is configured to return a unique identifier for these members. Subsequently, certain types of data flows could be charged differently amongst the members of the virtual talk group. For example, data communications between the members may have a reduced charge, whereas external data flows involving entities (e.g., individuals, servers, etc.) outside the virtual talk group could receive a higher charging rate. This disparity in rates can be provisioned in individual call data records for billing purposes. In other examples, multicast groups can be formed within the virtual talk group. These multicast groups, which are common in video gaming, can have a specific type of billing applied to their communications.

Figure 2:
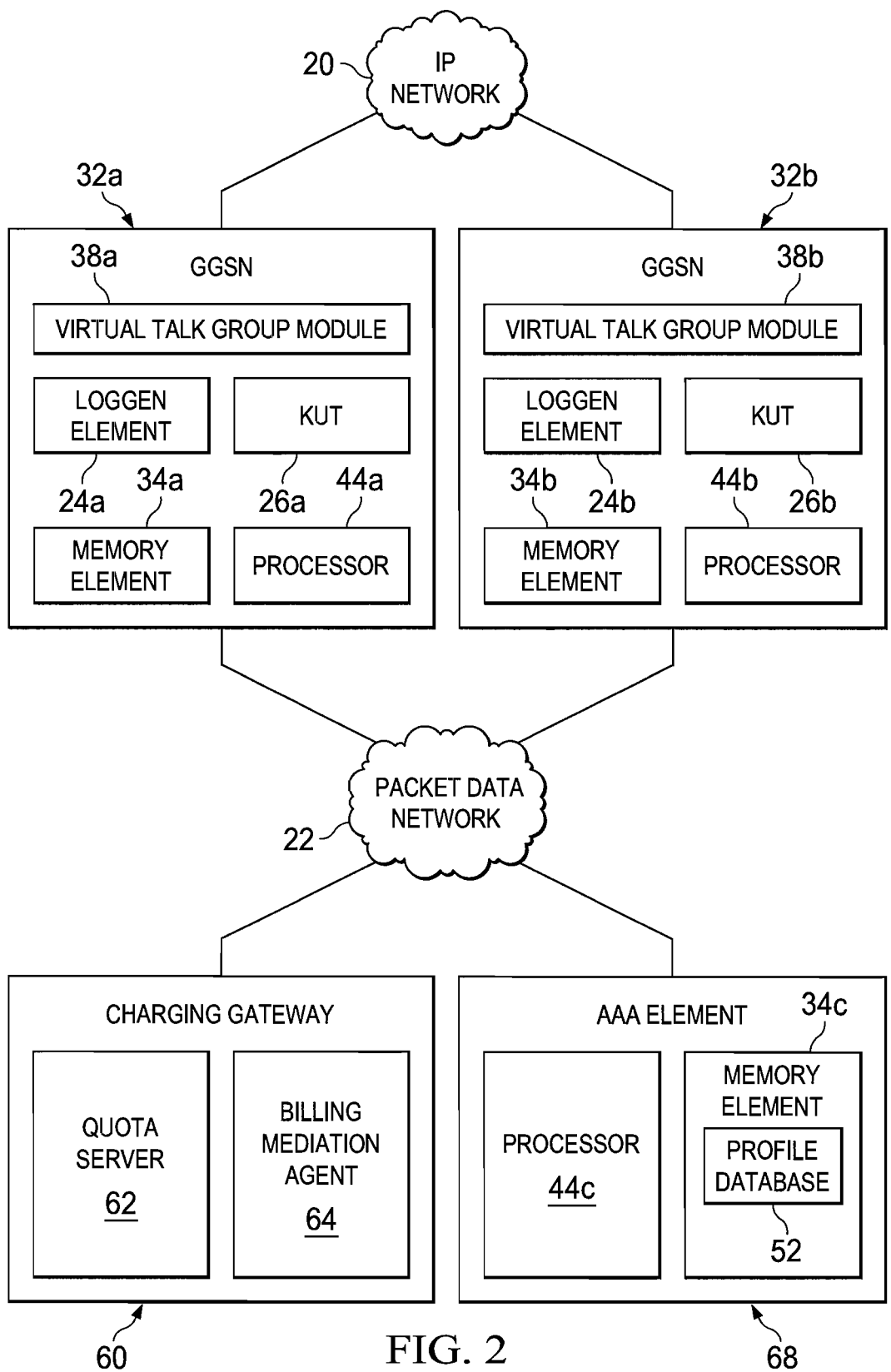
FIG. 2 is a simplified block diagram showing example details associated with the communication system in accordance with one embodiment of the present disclosure.

AAA element 68 can maintain profiles for particular members of the virtual talk group (e.g., in a database as shown in FIG. 2) and, further, mark the members as belonging to specific groups. For example, each member of a virtual talk group could have a profile that includes its associated group name. In addition, GGSNs 32*a-b* can be provided with intelligence (e.g., an application) for querying AAA element 68 for the group identifier.

Typically, as part of an authentication mechanism, an access response being sent back to a given GGSN can include attributes (e.g., Quality of Service (QoS) parameters, timeout values, etc.). These attributes can be subscriber specific. As detailed below, a new attribute (e.g., a string attribute for the corresponding user group) can be included in a download from AAA element 68 and this occurs during authentication. The new attribute identifies the group to which the authenticated user belongs. Once the profile for the group has been downloaded from AAA element 68, GGSNs 32*a-b* can form appropriate charging records for particular groups.

In accordance with example embodiments presented herein, each subscriber profile configured on AAA element 68 may be augmented to include a new attribute that defines the particular subscriber's virtual talk group. During an end user's initial attachment to the network, a given GGSN 32*a-b* can perform a customary authentication of the end user with AAA element 68. This could be followed by an authorization to download and to apply various attributes provisioned in AAA element 68. During authorization, AAA element 68 is configured to return a group name or group ID. In one example, the group name is set equal to the username of the primary subscriber of the group. The GGSN identifies this group name as a unique string, which identifies the full set of users of this group. In other particular examples, the attribute can be a vendor specific attribute.

As new members are added to the virtual talk group, the members can be provisioned in AAA element 68 with the same group name. When these additional subscribers attach to the network, a home AAA server can be used for authorization. The group name can be subsequently downloaded by a given GGSN. When a new group name is downloaded, the GGSN is configured to create a control-block for the group, where it associates this bearer to the group control block. As new bearers download the same group name, these are added to the same group control block. As bearers are added or deleted, the group control block dynamically adds/removes members.

Each GGSN 32*a-b* is configured to track the bytes from individual users, from groups, from subsets of users within the group, from multicast users, etc. Additionally, any given GGSN 32*a-b* can track different types of bytes (e.g., from the Internet, bytes being exchanged between users of the group, bytes to and from a subscriber involved in a communication with some other entity outside of the group, etc.). In regards to billing, any number of plans may be used in order to differentiate rates for given scenarios.

For example, a rollover scenario can be used to borrow, or to compensate for exceeding or underutilizing byte count allotments. For example, if two users were part of the same virtual talk group, and the first user has exceeded his allotted byte count, while the second user has underutilized his data allotment, then data bytes could be borrowed, rolled-over, swapped, or otherwise divided between accounts to offset these two accounts. Thus, data underutilization of a first subscriber of the group can be offset by data overutilization of a second subscriber of the group, where a summation of the data underutilization and the data overutilization does not exceed the original data allotment assigned to the group. This could achieve some level of savings for a primary user, who initially executed a service agreement in which the virtual talk group was established (e.g., in a family plan, a corporate plan, etc.). That initial agreement (e.g., a network data plan) could define how many bytes (50 MB) are allowed (e.g., in data quota scenarios) over a given time interval (e.g., monthly, weekly, daily, etc.). Thus, a given subscriber profile can include a group attribute that defines the subscriber as being part of a group of subscribers sharing a network data plan that defines a data allotment assigned to the group over a specified time interval.

Data restrictions or quota may be provisioned for the entire group, for each individual, for particular types of flows, or using any suitable combination of these elements. This includes pre-paid quota scenarios. Other billing scenarios can involve data rate plans based on a particular time of day. Still other billing scenarios can involve certain data flows not being charged at all (e.g., data flows between users in the virtual talk group, data flows involving video games that are played between users in a multicast virtual talk group, etc.). Some of these potential packet flows are discussed below and, further, are illustrated in an example set of flow diagrams depicted in FIGS. 4-5. Before turning to some of the operations of these arrangements, a brief discussion is provided about some of the possible infrastructure of FIG. 1.

Subscriber 12 can be associated with clients, customers, or end users wishing to initiate a communication in communication system 10 via some network. The term 'subscriber' is inclusive of devices used to initiate a communication, such as a computer, a personal digital assistant (PDA), a laptop or electronic notebook, a cellular telephone, an i-Phone, an IP phone, or any other device, component, element, or object capable of initiating voice, audio, video, media, or data exchanges within communication system 10. Subscriber 12 may also be inclusive of a suitable interface to the human user, such as a microphone, a display, or a keyboard or other terminal equipment. Subscriber 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

GGSNs 32*a*-*b* and AAA element 68 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

RAN 16 is a communication interface between subscriber 12 and SGSNs 18*a* and 18*b*. RAN 16 may comprise a base transceiver station and a base station controller in one embodiment. The communication interface provided by RAN 16 may allow data to be exchanged between subscriber 12 and any number of selected elements within communication system 10. RAN 16 may facilitate the delivery of a request packet generated by subscriber 12 and the reception of information sought by subscriber 12. RAN 16 is only one example of a communication interface between subscriber 12 and SGSNs 18*a* and 18*b*. Other suitable types of communication interfaces may be used for any appropriate network design and these may be based on specific communication architectures.

SGSNs 18*a*, 18*b*, and GGSNs 32*a*, 32*b* are communication nodes or elements that cooperate in order to facilitate a communication session involving subscriber 12. GGSNs 32*a*-*b* are communication nodes operating in a GPRS environment that may be working in conjunction with multiple SGSNs 18*a* and 18*b* to provide a communication medium in a GPRS service network. GGSNs 32*a* and 32*b* can provide a GPRS tunneling protocol (GTP), any packet data protocol (PDP) authentication, authorization, and accounting (AAA) operations, and QoS RAN signaling. GPRS may support multiple internet communication protocols and may enable existing IP, point-to-point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between subscriber 12 and selected GGSNs 32*a*-*b*, and may be any local area network (LAN), wireless local area network (WLAN), metropolitan area network (MAN), Intranet, Extranet, wide area network (WAN), virtual private network (VPN), or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets within communication system 10. Packet data network 22 offers a communicative interface between charging gateway 60 and AAA element 68. Packet data network 22 may foster any communications involving services, content, video, voice, or data more generally, as it is exchanged between subscriber 12 and various network elements.

FIG. 2 is a simplified block diagram showing possible example details associated with communication system 10 in accordance with one embodiment of the present disclosure. In this particular arrangement, each GGSN 32*a*-*b* may include a respective virtual talk group module 38*a*-*b*, a loggen element 24*a*-*b*, a known user table (KUT) 26*a*-*b*, a memory element 34*a*-*b*, and a processor 44*a*-44*b*. The individual processors can vary and the configuration could certainly include multiple traffic processors, which may have a logical connection to a control processor. AAA element 68 may similarly include a processor 44*c* and a memory element 34*c*, which may include a profile database 52 that is capable of storing individual profiles for each subscriber, each virtual talk group, each multicast group, etc. The profiles may be modified, changed, or systematically updated based on particular configuration scenarios.

Certain flow activity can be specified by configuring the profile for each particular subscriber. Such a profile can be stored within AAA element 68 (e.g., within profile database 52), provided in a table external to AAA element 68, provided in a database or an electronic repository, or otherwise suitably stored, maintained, cached, or referenced in order to execute virtual talk group service decisions. The profile can be attached to a billing plan (per-user) and/or a service (per-user service). The profile configuration can describe the various parameters for policing, billing, routing, and/or marking traffic. AAA element 68 and a given GGSN can communicate with each other using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

In one implementation, GGSNs 32*a*-*b* and AAA element 68 include software to achieve (or to foster) the virtual talk group operations, as outlined herein in this Specification. Note that in one example, each of these elements can have an internal structure (e.g., a processor, a memory element, etc.) to facilitate some of the operations described herein. In other embodiments, these virtual talk group features may be provided externally to these elements or included in some other network element to achieve this intended functionality. Alternatively, GGSNs 32*a*-*b* may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Loggen elements 24*a*-*b* are storage elements operable to construct billing records and to communicate the billing records to a billing system based on information provided by KUT 26*a*-*b*. Loggen elements 24*a*-*b* may also operate to store data for later use and provide appropriate formatting for billing records to be communicated to a billing system. Loggen elements 24*a*-*b* may be implemented using hardware, software, or any other suitable element or object operable to store information and to generate a billing record to be communicated to a billing system. Loggen elements 24*a*-*b* may generate logging records or billing records and additionally send messages to a billing system element associated with a change in SGSN.

KUT 26*a*-*b* are data storage elements that manage one or more correlations between the ID of subscriber 12 and a corresponding IP address. KUT 26*a*-*b* could be simply part of any memory element within a given GGSN 32*a*-*b*. KUT 26*a*-*b* may also store information relating to billing, previously designated for subscriber 12, and the billing system may be invoked when additional information associated with subscriber 12 is communicated over the network. KUT 26*a*-*b* may be consulted as additional billing records are created in order to determine that a billing system (e.g., charging gateway 60) should receive selected billing records. KUT 26a-b may also include an application program interface (API) that may be implemented in order to obtain user ID information for an IP address from a data flow.

KUT 26a-b are provided with the capability of mapping the source IP address (or any other subscriber 12 parameter) to a user ID. The user ID may be obtained from an external database, where appropriate, or any other suitable location. Alternatively, the user ID may be extracted from a RADIUS flow, a TACACS communication flow, a Diameter communication flow, or any other suitable communication protocol flow, communication session, or data exchange. The database may be populated at any suitable time and updated using any suitable mechanism, such as via the sniffing of RADIUS or TACACS flows.

Charging gateway 60 may include a quota server 62 and a billing mediation agent (BMA) 64. A billing record may be created within a given GGSN and subsequently sent to BMA 64. A look-up operation may then be performed in order to correlate the IP address of subscriber 12 in KUT 26a-b to the user ID that may be included in that billing record. A quota manager element (not shown) is an element that manages quota information for services subscribed to by subscriber 12. A quota manager element also provides an interface between GGSNs 32a and 32b and charging gateway 60 and may receive a communication that indicates a change in SGSN. A quota manager element may also identify new and old identifiers or pointers for selected SGSNs involved in the communication session and, subsequently, notify charging gateway 60 of changes. A quota manager element may also communicate with charging gateway 60 in order to exchange information associated with funding for subscriber 12. A quota manager element may also receive RADIUS updates from GGSN 32a or 32b that reflect the current status associated with subscriber 12.

Charging gateway 60 is configured to manage the billing and policies associated with a given subscriber 12. A given GGSN may communicate with charging gateway 60 in order to retrieve information or to learn of billing policies for subscriber 12. Quota server 62 may handle the service verification request that is used for subscriber 12 to receive any portion of requested content. A token mechanism could be implemented to achieve this result. Such token mechanisms, as well as the operations and processes associated with the tokens, can be provisioned within charging gateway 60.

It is important to note that KUT 26a-b can readily be replaced with any suitable bearer session, PDP context, or any other element that provides a suitable mechanism for such operations. Similarly, quota server 62 and BMA 64 can be replaced with an appropriate charging function (i.e., a more generic charging function) that could accommodate both online and offline charging activities for communication system 10.

FIG. 3 is a simplified diagram of an example charging data record 80. For example, charging record 80 could be created by a given GGSN 32a-b and sent to charging gateway 60 for additional processing. In this particular example, a new attribute is provided as an extension to charging record 80. This new attribute can be used as a field for the virtual user group. The new attribute can be part of charging record 80 for both the GGSN, the PGW, etc.

Operationally, the GGSN is configured to switch data packets to/from the Internet and, further, generate charging records at the bearer/flow level. With the user group feature, the GGSN is configured to count the byte counts (e.g., per-bearer) sent within the group separately, along with the total byte count carried over the bearer. The per-group charging can be achieved in multiple ways. For example, in one example implementation, a 3GPP CDR is enhanced to add an attribute indicating a corresponding user group. This allows charging gateway 60 to identify the group to which the user belongs. The billing system can then identify the bearer and the group corresponding to this charging record. A change request can be used as one possible mechanism to include the new attribute, and this could be formatted in the following manner: GGSNPDPRecord ::=SET {User-Group-Name [36] String OPTIONAL}

In another example implementation, the GGSN can count data traffic within the group separately and, further, include a service container indicating data bytes transferred to the members within the group (along with the group name). These bytes can be charged with a different rule on the billing system. One example operation includes the usage of an existing list of service data and this could be formatted in the following manner:

GGSNPDPRecord :: =SET

{listOfServiceData SEQUENCE OF ChangeOfServiceCondition OPTIONAL,}

ChangeOfServiceCondition ::=SEQUENCE

In addition, a special unique rating group ID can be used to include the inter-group data usage. The charging rule configuration can include the group name XYZ, which represents the name of the virtual user group. In regards to the flow-based charging service data container, the following formatting can be used for rating groups:

ratingGroup [1] RatingGroupId, <<set to 255

Virtual-User-group [12] String OPTIONAL, <<Set Virtual user group name.

In yet another implementation, the GGSN can be configured to generate a per-user group charging record, which reports data usage of the entire group. This can include byte counts sent within the group, active bearers in the group, byte counts of each individual bearer belonging to the group, etc. Any of these charging possibilities can offer diverse billing mechanisms for network operators to differentiate their service agreements for their subscribers.

FIG. 4 is a simplified flow diagram illustrating an example flow 100 in which a primary member of a virtual talk group attaches to the network. This particular flow involves a subscriber (Jim), who seeks to connect to the network. At step 1, a PDP context activate request is sent to an SGSN. At step 2, a create PDP context request is sent to some type of network element ((e.g., a GGSN, a PGW, etc.). At step 3, an access request is sent to an AAA server. This particular request asks for a download of a specific profile, which includes a new attribute for identifying the virtual talk group (e.g., group ID XYZ).

At step 4, an access accept message is sent back to the GGSN. At step 5, an accounting request start message is sent to the AAA server, where a subsequent create PDP context response is delivered back to the SGSN at step 6. The AAA server responds with an accounting response at step 7, and the activate PDP context accept is delivered back to the subscriber in step 8. At step 9, user data flows between the subscriber and the network.

In regards to deactivation, at step 10, a deactivate PDP context request is delivered to the SGSN. The GGSN subsequently receives a delete PDP context request at step 11. An accounting request stop message is delivered to the AAA element at step 12, where a delete PDP context response is sent back to the SGSN at step 13. At step 14, an accounting response stop message is sent to the GGSN. A deactivate PDP context accept message is sent to the subscriber at step 15. At step 16, a charging data record is exchanged between the GGSN and the charging gateway.

Figure 5:
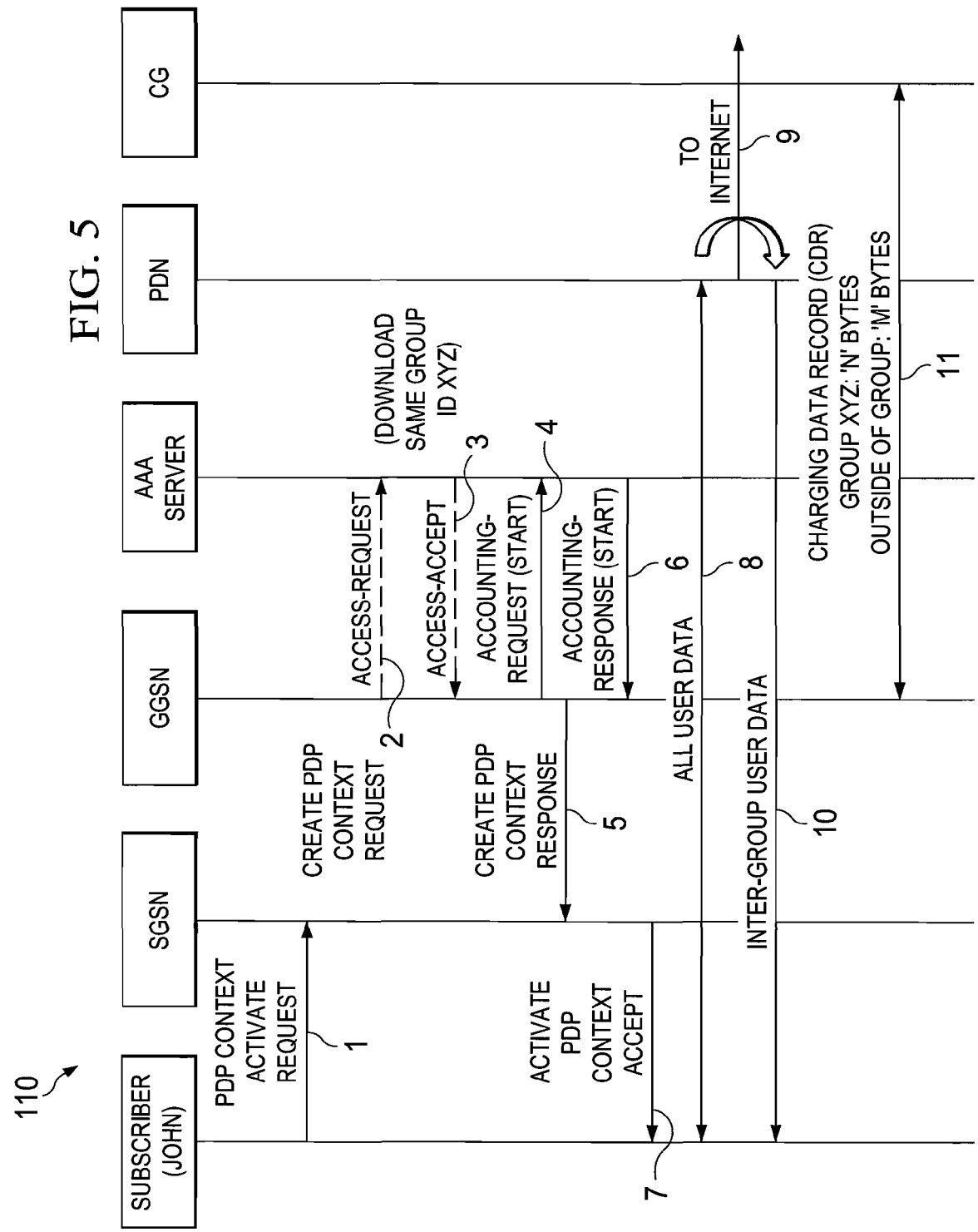

FIG. 5 is a simplified flow diagram of an example flow 110 in which a second member of the group attaches to the network. This particular flow involves a second subscriber (John), who is part of the subscriber group of the primary subscriber Jim (from FIG. 4). The user equipment being operated by John can send a PDP context activate request to the SGSN, where a create PDP context request propagates to a given GGSN. At step 2, an access request is sent to an AAA server, where the same group ID (XYZ) is downloaded. At step 3, an access accept message is sent from the AAA server to the GGSN. An accounting request start is exchanged between the GGSN and the AAA server at step 4. At step 5, a create PDP context response is sent to the SGSN. An accounting response message is sent by the AAA server at step 6. An activate PDP context accept message is delivered to John at step 7. User data is exchanged between John and the packet data network in step 8. In step 9, the packet data network exchanges information from the Internet, where the charging gateway is privy to this information exchange. Inter-group user data propagates between the packet data network and John at step 10. At step 11, a charging data record is exchanged between the GGSN and the charging gateway. In this particular example, 'N' bytes are associated with group ID XYZ, where 'M' bites are exchanged outside of this group.

Note that in certain example implementations, the virtual talk group functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, GGSNs 32*a-b* and AAA element 68 may include software in order to achieve the virtual talk group functions outlined herein. These activities can be facilitated by virtual talk group modules 38*a-b* and profile database 52. GGSNs 32*a-b* and AAA element 68 can include memory elements for storing information to be used in achieving the intelligent virtual talk group tracking, as outlined herein. Additionally, GGSNs 32*a-b* and AAA element 68 may include a processor that can execute software or an algorithm to perform the virtual talk group tracking, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, lookup table, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Moreover, it should is imperative to note that the term 'talk' as used herein in this Specification has been done for example purposes only. Accordingly, communication system 10 can readily be applicable to scenarios in which data is tracked for any type of group (which may not necessarily implicate voice communications). Thus, simple data communications involving web traffic, graphics, text, e-mail, or other non-voice information can readily be accommodated by communication system 10. The group plans could then be configured for particular types of data, or content types for the members of the virtual group.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain GGSN components, communication system 10 may be applicable to other protocols and arrangements such as any type of network access server (NAS), GPRS entry point, etc.

In addition, such a concept is amenable to prepaid arrangements, to Gx-enabled network applications, and policy and charging control (PCC) interfaces. Also, the presented architecture is applicable to Long Term Evolution (LTE) deployments. Further, as noted previously, any of the GGSNs and SGSNs in the flow diagrams can readily be replaced with PDN gateways and service gateways (SGWs). It should also be noted that while some of the flows detailed above are indicative of offline charging scenarios, where charging records are generated by the GGSN and are processed offline by the billing system, the same functions can be applied to online charging equally. The quota downloaded from online charging (e.g., via a prepaid quota server) can be applied differently for inter-group data and data usage outside of the group. Additionally, quota server 62 can be provisioned to include separate quota for use within the group and another quota designation for data outside of the group.

Moreover, the present disclosure is equally applicable to various cellular and/or wireless technologies including CDMA, Wi-Fi, WiMax, etc. In addition, other example environments that could use the features defined herein include Pico and femto architectures, where an appropriate virtual talk group tracking would occur for one or more packets. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
    communicating an access request from a general packet radio service support node ("GGSN") to an authentication, authorization, and accounting ("AAA") element, wherein the access request is associated with network authentication relating to a subscriber; and
    receiving at the GGSN from the AAA element in response to the access request an access response that includes a profile associated with the subscriber, wherein the profile includes a group attribute that defines the subscriber as being part of a group of subscribers comprising a virtual user group sharing a network data plan that defines a data allotment assigned to the group over a specified time interval;
    wherein the communicating and receiving occur during an attachment of the subscriber to a network to establish a communications session via the network; and
    wherein the receiving includes receiving a unique data string sent by the AAA element, and wherein the unique data string identifies a full set of subscribers belonging to the virtual user group.

2. The method of claim 1, wherein data underutilization of a first subscriber of the group is offset by data overutilization of a second subscriber of the group, and wherein a summation of the data underutilization and the data overutilization do not exceed the data allotment assigned to the group.

3. The method of claim 1, wherein the group attribute identifies the subscriber as belonging to the group of subscribers by using a selected one of an International Mobile Subscriber Identity (IMSI), a Mobile Subscriber Integrated Services Digital Network Number (MSISDN), a user name, and an Internet protocol (IP) address of the subscriber.

4. The method of claim 1, wherein a first data threshold is defined for each subscriber of the group separately from the data allotment assigned to the group in the network data plan.

5. The method of claim 1, further comprising:
    creating a group control block for data propagation associated with the group of subscribers, wherein individual network bearer paths are associated with the group control block; and
    creating call detail records for data propagation associated with the group of subscribers.

6. The method of claim 1, wherein a rating group identifier is used to track intra-group data usage between the subscribers of the group independent of tracking of external communications involving entities outside of the group of subscribers.

7. Logic encoded in one or more non-transitory tangible media that includes code for execution and when executed by a processor operable to perform operations comprising:
    communicating an access request from a general packet radio service support node ("GGSN") to an authentication, authorization, and accounting ("AAA") element, wherein the access request is associated with network authentication relating to a subscriber; and
    receiving at the GGSN from the AAA element in response to the access request an access response that includes a profile associated with the subscriber, wherein the profile includes a group attribute that defines the subscriber as being part of a group of subscribers comprising a virtual user group sharing a network data plan that defines a data allotment assigned to the group over a specified time interval;
    wherein the communicating and receiving occur during an attachment of the subscriber to a network to establish a communications session via the network; and
    wherein the receiving includes receiving a unique data string sent by the AAA element, and wherein the unique data string identifies a full set of subscribers belonging to the virtual user group.

8. The logic of claim 7, wherein data underutilization of a first subscriber of the group is offset by data overutilization of a second subscriber of the group, and wherein a summation of the data underutilization and the data overutilization do not exceed the data allotment assigned to the group.

9. The logic of claim 7, wherein the group attribute identifies the subscriber as belonging to the group of subscribers by using a selected one of an International Mobile Subscriber Identity (IMSI), a Mobile Subscriber Integrated Services Digital Network Number (MSISDN), a user name, and an Internet protocol (IP) address of the subscriber.

10. The logic of claim 7, wherein a first data threshold is defined for each subscriber of the group separately from the data allotment assigned to the group in the network data plan.

11. The logic of claim 7, wherein a rating group identifier is used to track intra-group data usage between the subscribers of the group independent of tracking of external communications involving entities outside of the group of subscribers.

12. An apparatus, comprising:
    a memory element configured to store data,
    a processor operable to execute instructions associated with the data, and
    a group module configured to:
        communicate an access request from a general packet radio service support node ("GGSN") to an authentication, authorization, and accounting ("AAA") element, wherein the access request is associated with network authentication relating to a subscriber; and
        receive at the GGSN from the AAA element in response to the access request an access response that includes a profile associated with the subscriber, wherein the profile includes a group attribute that defines the subscriber as being part of a group of subscribers comprising a virtual user group sharing a network data plan that defines a data allotment assigned to the group over a specified time interval;

wherein the communicating and receiving occur during an attachment of the subscriber to a network to establish a communications session via the network; and wherein the receiving includes receiving a unique data string sent by the AAA element, and wherein the unique data string identifies a full set of subscribers belonging to the virtual user group.

13. The apparatus of claim 12, wherein data underutilization of a first subscriber of the group is offset by data overutilization of a second subscriber of the group, and wherein a summation of the data underutilization and the data overutilization do not exceed the data allotment assigned to the group.

14. The apparatus of claim 12, wherein the group attribute identifies the subscriber as belonging to the group of subscribers by using a selected one of an International Mobile Subscriber Identity (IMSI), a Mobile Subscriber Integrated Services Digital Network Number (MSISDN), a user name, and an Internet protocol (IP) address of the subscriber.

15. The apparatus of claim 12, wherein a first data threshold is defined for each subscriber of the group separately from the data allotment assigned to the group in the network data plan.

16. The apparatus of claim 12, wherein a rating group identifier is used to track intra-group data usage between the subscribers of the group independent of tracking of external communications involving entities outside of the group of subscribers.

17. The apparatus of claim 12, wherein the AAA element is configured to interact with the group module and includes a profile database configured to maintain a plurality of unique data strings, which identify sets of subscribers belonging to a plurality of subscriber groups.

* * * * *